(12) United States Patent
Sackstein et al.

(10) Patent No.: US 6,744,815 B1
(45) Date of Patent: Jun. 1, 2004

(54) METHOD FOR SYNCHRONIZING AUDIO AND VIDEO STREAMS

(75) Inventors: David Sackstein, Netanya (IL); Yehuda Elmaliach, Rosh Haayin (IL)

(73) Assignee: Optibase Ltd., Herzelia (IL)

( * ) Notice: Subject to any disclaimer, the term of this patent is extended or adjusted under 35 U.S.C. 154(b) by 0 days.

(21) Appl. No.: 09/083,378

(22) Filed: May 22, 1998

(30) Foreign Application Priority Data

Mar. 31, 1998 (IL) .................................................. 123906

(51) Int. Cl.[7] .............................................. H04B 1/66
(52) U.S. Cl. ............. 375/240; 375/240.27; 375/240.28; 375/355; 348/423; 348/439; 348/461; 348/462; 348/464; 348/515; 348/521; 348/500
(58) Field of Search ........................... 375/240.27, 240, 375/240.28, 355; 348/423, 461, 439, 462–464, 440, 500, 448, 572, 484, 443, 575, 458, 459, 482, 515, 548, 512, 513, 516

(56) References Cited

U.S. PATENT DOCUMENTS

| | | | | | |
|---|---|---|---|---|---|
| 5,570,296 A | * | 10/1996 | Heyl et al. | .................. | 709/231 |
| 5,647,008 A | | 7/1997 | Farhangi et al. | | |
| 5,874,997 A | * | 2/1999 | Haigh | .................... | 375/240.25 |
| 5,898,695 A | | 4/1999 | Fujii et al. | | |
| 5,937,138 A | * | 8/1999 | Fukuda et al. | ......... | 375/240.05 |
| 5,949,410 A | * | 9/1999 | Fung | ............................ | 348/12 |
| 6,058,141 A | * | 5/2000 | Barger et al. | ................ | 375/240 |
| 6,181,383 B1 | * | 1/2001 | Fox et al. | .................... | 348/515 |

* cited by examiner

*Primary Examiner*—Shawn S. An
(74) *Attorney, Agent, or Firm*—Eitan, Pearl, Latzer & Cohen Zedek, LLP

(57) ABSTRACT

In a combined audio and video encoding system, the encoding system receiving a stream of video samples and a stream of audio samples, the encoding system producing an encoded video stream from the video samples and an encoded audio stream from the audio samples, a method for synchronizing between the encoded video stream and the encoded audio stream, the method including the steps of monitoring the encoded video stream and the encoded audio stream, detecting the amount of video data accumulated from the encoded video stream in a given time period, detecting the amount of audio data accumulated from the encoded audio stream in a given time period, increasing the number of audio samples in the audio stream, when the accumulated amount of video data is greater than the accumulated amount of audio data and decreasing the number of audio samples in the audio stream, when the accumulated amount of audio data is greater than the accumulated amount of video data.

21 Claims, 6 Drawing Sheets

METHOD FOR SYNCHRONIZING AUDIO AND VIDEO STREAMS

PRIOR APPLICATION DATA

This application claims foreign priority from Israeli Application No. 123906, filed on Mar. 31, 1998 and entitled "METHOD FOR SYNCHRONIZING AUDIO AND VIDEO STREAMS", which is incorporated by reference in its entirety herein.

FIELD OF THE INVENTION

The present invention relates to a method and a system for synchronizing audio and video signals in general and to a method and a system for synchronizing MPEG video and audio streams in particular.

BACKGROUND OF THE INVENTION

Methods and systems for providing synchronized audio and video streams are known in the art. For example, MPEG specifications ISO/IEC 11172-1,2,3 (MPEG1) and the ISO/IEC 13818-1,2,3 (MPEG2) describe a method of encoding and decoding analog audio and video.

The encoding process consists of three stages. The first stage is digitizing the analog audio/video signals. The second stage is compression of the digital signals to create elementary streams. The third stage is multiplexing the elementary streams into a single stream.

The decoding process consists of inversing each of these stages and applying them in the reverse order. Reference is now made to FIG. 1, which is a schematic illustration of an encoding and decoding system, generally referenced 10, known in the art.

System 10 includes an encoding device 20 and a decoding device 40. The encoding device 20 includes an audio encoder 12, a video encoder 22 and a multiplexor 18. The audio encoder 12 includes an audio analog to digital converter (A/D) 14 and an audio compressor 16. The video encoder 22 includes a video A/D 24 and a video compressor 26. The audio compressor 16 is connected to the audio A/D 14 and to the multiplexor 18. The video compressor is connected to the video A/D 24 and to the multiplexor 18. An A/D converter is also known as a digitizer.

The decoding section 40 includes an audio decoder 32, a video decoder 42 and a de-multiplexor 38. The audio decoder 32 includes an audio digital to analog converter (D/A) 34 and an audio decompressor 36. The video decoder 42 includes a video D/A 44 and a video decompressor 46. The audio decompressor 36 is connected to the audio D/A 34 and to the de-multiplexor 38. The video decompressor 46 is connected to the video D/A 44 and to the de-multiplexor 38.

Each of the A/D converters 14 and 24 is driven by an independent sampling clock. The origin of this clock differs in audio and video encoders 12 and 22. Each of the respective compressors 16 and 26 is affected by the sampling clock of the A/D converter connected thereto.

Analog audio is a continuous, one-dimensional function of time. Digitization of analog audio amounts to temporal sampling and the quantization of each sampled value. It will be appreciated by those skilled in the art that the audio digitizer clock is not derived from the analog source signal.

Analog video is a two dimensional function of time, temporally sampled to give frames (or fields) and spatially sampled to give lines. The broadcasting standard of the analog video source signal (e.g. PAL, NTSC), defines the number of frames/fields per second and the number of lines in each frame/field.

Analog video is therefore a discrete collection of lines which are, like analog audio signals, one-dimensional functions of time. Timing information is modulated into the analog video signal to mark the start of fields/frames and the start of lines. The timing of the pixel samples within each line is left to the digitizer, but the digitizer must begin sampling lines at the times indicated by the signal.

Video digitizers typically feed analog timing information into a phase locked loop to filter out noise on the video signal and divide the clock accordingly to derive the pixel clock for digitizing each line. Thus the timing of video sampling is derived from the analog source signal. In the case of video, digitization refers only to the quantization of pixels and CCIR 601 is an example of a video digitizing standard that describes such a process.

The input of a video or audio compression module, such as compressors 16 and 26, is samples or sets of samples. The output is a compressed bit-stream.

As the compressor consumes the samples produced by its respective digitizer, its timing is slaved to that digitizer. In a simple model of the system, the compressor has no clock of its own. Instead, it uses the bit-rate specification to calculate the number of bits required per sample or set of samples. As samples appear at the input of the encoder, they are compressed and the compressed bits appear at the output.

It will be appreciated by those skilled in the art that the actual timing of audio or video compressed bit emission by an encoder is determined by the digitizer clock which times the arrival of samples at the compressor input.

The timing of the video digitizer 24 is derived from the video analog source and the video compressor 26 derives its own timing from the digitizer 24. Thus the timing of the video compressor is derived from the analog video source. If the timing information in the analog source is missing or incomplete, then the compressor 26 will be subject to abnormal timing constraints.

The following are examples of problematic video input sources:

The analog source is not a professional one (cheap VCR).
Noise is present on the line that carries the video signal.
The source is detached from the input for some time.
The video source is a VCR without a TBC (Time Base Corrector) and fast forward or rewind are applied.

The effects of problematic video input sources on the compressed stream depends on the nature of the problem and the implementation of the encoder.

Among the timing information present in the analog video signal are pulses that indicate the start of a field, the start of a frame and the start of a line.

If, for instance, noise is interpreted by the digitizer as a spurious pulse marking the start of a field, such that the pulse is not followed by a complete set of lines, then the timing information will become inconsistent.

One encoder might interpret the pulse as an extra field, somehow producing a complete compressed field. Another encoder might react to the glitch by discarding the field it was encoding. In both these cases, the ratio between the number of bits in the stream and compressed frames in the stream may be correct, but one encoder will have produced more frames than the other within the same interval and from the same source.

To an observer at the output of the encoders, this would appear to be caused by a variance between the clocks that drive the video encoders.

As will be appreciated by those skilled in the art, each video and audio encoder may be driven by its own clock. Decoders may also be driven by independent clocks.

As an example of the operation of system 10 the video encoder and audio encoder are fed from the same PAL source (analog video combined with analog audio).

The number of frames that are compressed within a given time interval can be calculated by multiplying the interval measured in seconds by twenty five (according to the PAL broadcasting standard).

In this example, the clocks of the video and audio decoders and the clock of the audio encoder have identical timing. The clock of the video encoder is running slightly fast with respect to the others.

Thus, within a given interval measured by the video decoder clock, the video encoder will produce more frames than the number calculated from the duration of that interval. The video decoder will play the compressed stream at a slower rate than the rate at which the video encoder produces that stream. The result will be that over any given interval, the video display will be slightly delayed.

As the timing of the audio encoder and audio decoder are identical, audio decoding will progress at the same rate as audio encoding. The result will be a loss of audio video synchronization at the decoder display.

It is a basic requirement to be able to guarantee that the decoded audio and video at the output of MPEG decoders are synchronized with each other despite the relative independence of the timings of the units in the system.

One of the methods known in the art to synchronize audio and video streams is called end-to-end synchronization. This means that the timing of each encoder determines the timing of its associated decoder. End-to-end synchronization is supported by the MPEG system layers. If this were applied to the example above, the video decoder would spend the same time displaying the video as the audio decoder spends decoding the audio. The audio and video would therefore play back synchronously.

The MPEG multiplexor implements the MPEG system layers. The system layer may use the syntax of MPEG1 System, MPEG2 Program or MPEG2 Transport. These layers support end-to-end synchronization by the embedding in the multiplexed stream of presentation time stamps (PTS fields), decoding time stamps (DTS fields) and either system clock references (SCR fields), in the case of MPEG1 System, or program clock references (PCR fields), in the case of MPEG2 Program or MPEG2 Transport. In the following, SCR will be used to refer to either SCR or PCR fields.

A conventional MPEG multiplexor operates under the following assumptions:

The deviations between all clocks in the system, free-running as they may be, are bound due to constraints on clock tolerance and rate of change.

The channel between the encoder and decoder introduces no delay or a constant delay.

The multiplexor uses an additional clock called the system time clock (STC). The multiplexor reads this clock to produce time stamps (DTS and PTS values) for each compressed stream (audio and video).

According to a first aspect of end-to-end synchronization, the SCR fields enable the reconstruction of the encoder STC by the demultiplexor 38. From time to time, the multiplexor 18 embeds SCR fields in the multiplexed stream. These fields contain the time, according to the STC, at which the last byte of the SCR field leaves the encoder.

As the delay across the channel is constant, the time that elapses between the emission of two SCR fields according to any clock is the same as that which elapses between their arrivals at the decoder according to the same clock. The elapsed time according to the STC is the difference between the SCR values embedded in those fields.

A free-running clock at the demultiplexor 38 can be adjusted using a phase-locked loop so that the interval it registers between the arrivals of any two SCR fields in the stream is exactly the difference between the times indicated by those fields. Thus the STC is reconstructed by the demultiplexor.

According to a second aspect of end-to-end synchronization, the DTS and PTS associate a time value with selected video or audio frames within the stream. These time stamps indicate the time according to the STC, at which the associated frames are encoded.

As the channel introduces no delay or a constant delay, all time values (in PTS, DTS, SCR or PCR fields) measured during multiplexing can be used to schedule the demultiplexing and decoding process. The constant delay if any, can be subtracted from the times measured in the decoder device, for comparison.

After the subtraction of the constant delay, the decoding and display of frames is scheduled at precisely the times specified in the PTS and DTS fields with respect to the reconstructed STC.

Thus both aspects of end-to-end synchronization together, ensure that each elementary stream encoder runs at the same rate as its peer encoder.

When applied to system 10, the decoder 42 will decode frames at the same rate as they are encoded, and thus the audio and video will play back synchronously.

There are some disadvantages to the above method of end-to-end synchronization. One of these disadvantages is that this method is not applicable by MPEG2 Transport multiplexors, for program encoders. The MPEG2 Transport specification requires encoders of audio and video, belonging to one Program, to be driven by the same clock. (A Program or Service within an MPEG2 Transport stream contains audio and video that are associated with each other and are expected to play back synchronously).

Another disadvantage is that even for MPEG1 System and MPEG2 Program multiplexors, the method described is not trivial to implement. The method requires the multiplexor to perform certain operations at certain times and to read the STC when those events occur. If there are deviations from those times, then the multiplexor 18 must somehow correct the STC readings.

One aspect of this disadvantage involves the embedding of the SCR fields. The SCR fields contain readings of the STC when the last byte of the field is emitted by the encoder. In a real system, the output of the multiplexor might be very bursty, thus introducing a jitter in the SCR fields. In order to reduce the jitter to a tolerable level, the multiplexor needs to perform some measure of correction for the SCR readings. Some methods known in the art apply an output stage, to smooth the burstiness.

Another aspect of this disadvantage involves the embedding of the PTS and DTS fields. If the video encoder produces a few frames together in one burst, then the time stamps read from the STC might have an intolerable amount of jitter. The multiplexor will need to smooth the burstiness of the elementary stream encoders with an input stage or it will have to correct the time stamps to compensate for their burstiness.

It will be appreciated by those skilled in the art that adding an input stage or an output stage for smoothing introduces delay.

In order to eliminate these disadvantages, it is expedient to use video and audio encoders that use the same clock to drive their digitizers together with the end-to-end synchronization method supported by the MPEG system layers.

When this policy is employed, the first disadvantage is no longer relevant as this is precisely what is required for Transport Program encoders. The second disadvantage can be overcome as follows.

The STC is selected as the video encoder clock (equivalent to selecting the audio clock). Between the compression of consecutive video frames the video clock registers, by definition of the video encoder clock, the elapse of exactly the nominal frame time (e.g. 40 milliseconds for PAL). The video clock is the STC, therefore this is also the interval observed by the STC. Therefore decoding time stamps can be calculated by multiplying the index of the video frame and the nominal frame time (e.g. 40 milliseconds for PAL).

Moreover, when the STC is selected as the audio clock audio decoding time stamps can be calculated without reading the STC. When the video clock and the audio clock are identical, all DTS and PTS values can be calculated without reading the STC.

Moreover, if the network clock is identical to the video clock, the SCR values can be calculated without reading the STC. Each SCR is calculated by multiplying the index of the last byte of the SCR field within the multiplexed stream by the constant bit-rate of the multiplexed stream across the network.

Thus, if all elementary streams and the network are driven by the same clock the implementation of end-to-end synchronization is not complicated by bursty elementary stream encoders and multiplexors.

In a typical implementation, known in the art, elementary stream encoder pairs (video and audio) are often driven by the same clock, however the network clock is independent. In these cases, time stamps can be calculated as described, but SCR values must be read in real-time from the STC.

The synchronization methods described above do not provide an adequate solution in two cases. In the first case, the video and audio encoder clocks are not synchronized (locked). In the second case the video and audio encoder clocks are synchronized, however, the video encoder clock drifts with respect to the audio encoder clock due to a problematic video source.

A time base corrector (TBC) is a device, known in the art, which filters noise out of the timing information of a video signal. The output of a TBC will be stable even if the input is a problematic video source such as a fast-forwarding VCR, a low-quality VCR or a disconnected source.

Some MPEG encoder systems require time base correction of video signals to prevent video encoder timing to drift. Professional video equipment often has a built in TBC at its output. In other cases an external appliance is used.

Using a TBC has some disadvantages, one of which is that requiring a TBC adds additional cost to the system.

Another disadvantage is that though a TBC overcomes noise introduced by problematic video sources, it does not lock the video clock with the audio clock. Therefore a TBC is useful in the above second case but not in the above first case.

A further disadvantage of using an external TBC, is that it introduces a delay in the video signal. The audio is typically not delayed in the TBC. Though this delay is small (typically one or two video frames) and constant, it can cause a detectable loss of audio video synchronization. An ideal system will need to compensate for this delay possibly introducing further cost.

Another method known in the art is referred to as periodic reset. Some MPEG encoders are programmed to stop and restart after many hours of operation. This flushes any accumulated loss of synchronization.

It will be appreciated that this method has some disadvantages, one of them being that stopping an MPEG encoder and restarting is a time consuming process. (It may take as much as a few video frames.) During this time the output of the decoder is interrupted.

Another disadvantage is that, depending on the implementation of the decoder, additional delay may be incurred until the decoder restarts after a reset.

A further disadvantage is that the interval between resets (the reset period) should be determined by the time it takes for the system to accumulate a discernible delay. This period is system dependent and therefore is difficult to determine in the general case.

SUMMARY OF THE PRESENT INVENTION

It is an object of the present invention to provide a novel system for providing video and audio stream synchronization, which overcomes the disadvantages of the prior art.

It is another object of the present invention to provide a method for synchronizing audio and video streams, which overcome the disadvantages of the prior art.

In accordance with a preferred embodiment of the present invention, there is thus provided a method for synchronizing between the encoded streams. The method is implemented in an encoding system receiving a plurality of elementary streams. Each of the elementary streams includes a plurality of elementary samples.

The encoding system produces an encoded stream from each of the elementary streams. Each of the encoded streams includes a plurality of encoded samples. Each elementary stream and its associated encoded stream define a stream including a plurality of samples.

The method including the steps of:

monitoring the encoded streams, detecting the rate of production of each encoded stream, increasing the number of samples in one of the streams when the rate of production of the encoded stream associated with that one stream is greater than the rate of production of another encoded stream, and decreasing the number of samples in one of the streams when the rate of production of the encoded stream associated with that one stream is lower than the rate of production of another encoded stream.

Each of the elementary streams can either be an audio stream or a video stream.

The step of increasing can either include increasing the number of the elementary samples in the elementary stream associated with that one stream or increasing the number of the encoded samples in the encoded stream associated with that one stream.

The step of decreasing can either include decreasing the number of the elementary samples in the elementary stream associated with that one stream or decreasing the number of the encoded samples in the encoded stream associated with that one stream.

The method can further include a step of normalizing between the rates of production of the encoded streams, before the steps of increasing and decreasing.

Increasing the number of samples can be performed in many ways, such as duplicating at least one of the samples, adding a sample between two selected samples, replacing selected samples with a greater number of new samples, and the like.

Decreasing the number of samples can be performed in many ways, such as deleting at least one sample, skipping at least one samples, replacing at least two samples with fewer new samples, and the like.

In accordance with another aspect of the present invention there is provided a method for detecting synchronization loss between the encoded streams. The method includes the steps of:

monitoring the encoded streams, detecting the rate of production of each encoded stream, and detecting the difference between the rates of production.

Accordingly, this method can also be a step of normalizing between the rates of production of the encoded streams, before the step of detecting the difference.

In accordance with a further aspect of the present invention, there is thus provided a method for reducing the rate of production of one of the streams with respect to the rate of production of another stream. The method includes the step of decreasing the number of the samples in the one stream.

In accordance with a yet another aspect of the present invention, there is thus provided a method for reducing the rate of production of one of the streams with respect to the rate of production of another stream. The method includes the step of increasing the number of samples in the other stream.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention overcomes the disadvantages of the prior art by providing reliable detection of audio/video synchronization loss, fine tuning of the audio sampling clock and a feedback mechanism that uses the above to maintain precise audio/video synchronization.

The following example demonstrates fine tuning of the audio sampling clock.

Figure 1:
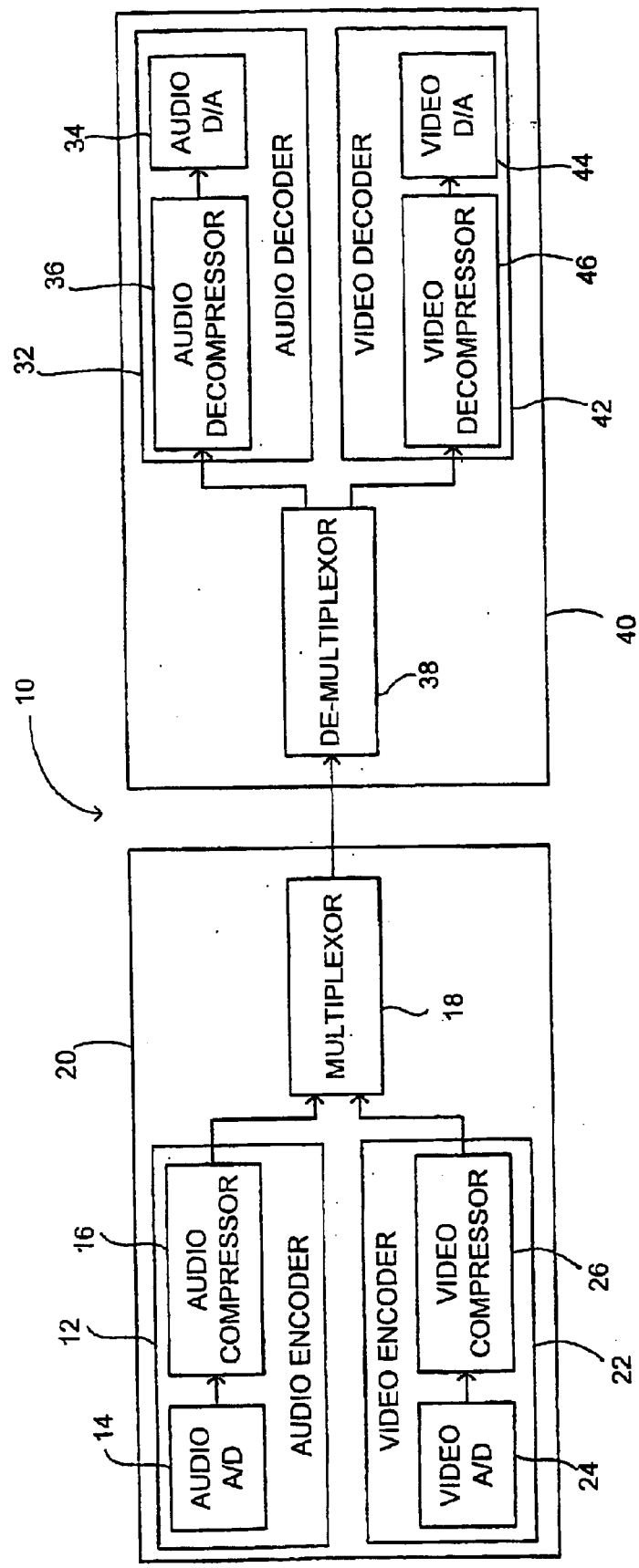
FIG. 1 is a schematic illustration of an encoding and decoding system, known in the art.
Figure 2:
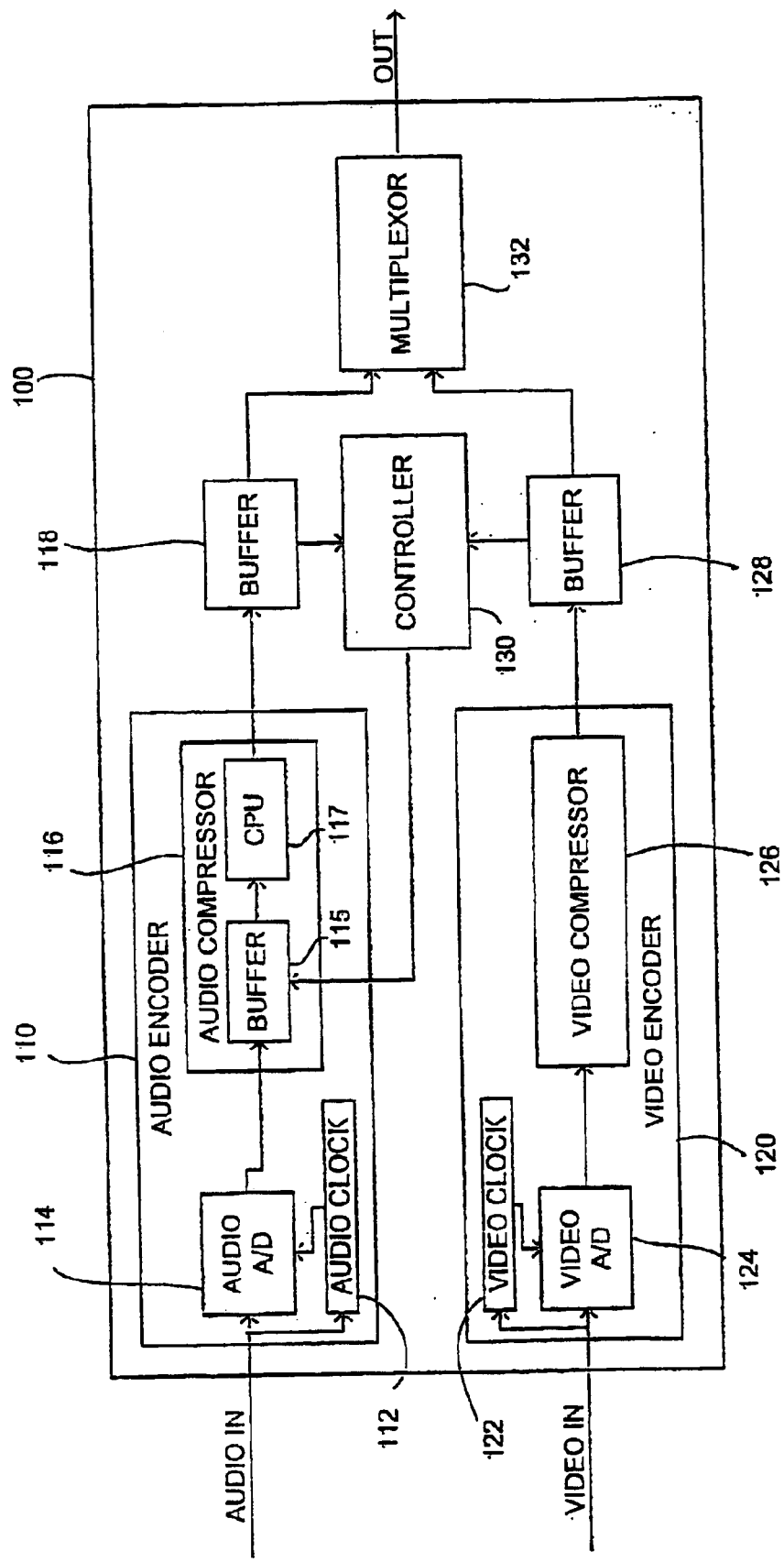
FIG. 2 is a schematic illustration of an encoding system, constructed and operative in accordance with a preferred embodiment of the present invention.

Reference is now made to FIG. 2, which is a schematic illustration of an encoding system, generally referenced 100, constructed and operative in accordance with a preferred embodiment of the present invention. System 100 includes an audio encoder 110, a video encoder 120, two buffers 118 and 128, a controller 130 and a multiplexor 132.

The audio encoder 110 includes an audio A/D converter 114, and audio compressor 116, connected therebetween and an audio clock 112, connected to the A/D converter 114 and to the audio source.

The video encoder 120 includes a video A/D converter 124, a video compressor 126, connected therebetween and a clock 122, connected to the A/D converter 124 and to the video source.

The buffer 118 is connected to the audio compressor 116, the controller 130 and the multiplexor 132. The buffer 128 is connected to the video compressor 126, the controller 130 and the multiplexor 132.

The audio compressor 116 includes an input buffer 115, for temporal storage of audio samples and a CPU 117, connected therebetween. The controller 130 is further connected to the buffer 115. The video clock 122 need not be locked to the audio clock 112.

The digitizer 114 provides audio samples to the compressor 116 encoder at a rate dictated by its sampling clock 112. The compressor 116 has no knowledge of the pass of time except through the samples that arrive at its input. In a preferred embodiment of the invention the input buffer 115 of the encoder (audio compressor 116) is managed through software running on the encoder 110.

The present invention provides a novel method for controlling the sampled audio streams with respect to the sampled video stream. Upon request, the number of samples in buffer 115 can be increased or decreased.

Decrementing the write pointer in buffer 115 is one example for decreasing the number of audio samples therein, while duplicating an audio sample in buffer 115 is one example for increasing the number of audio samples therein.

Even at a sampling rate of 32 KHz an additional sample or a missing sample every second cannot be detected by the human ear but effectively changes the sampling clock rate by 31.25 ppm.

It will be noted that because the modifications introduced by the above method effect the sample set before it is compressed, the MPEG stream produced by a system operated as above is legal as long as the CPU 117 complies to the MPEG audio encoding standard.

It will be noted that decreasing the number of audio samples can be performed in a plurality of ways such as deleting or skipping one or more sample or replacing a number of samples with fewer samples which are calculated from the replaced samples, or any other samples in the stream, and represent the information therein.

It will further be noted that increasing the number of audio samples can be performed in a plurality of ways such as duplicating or repeating one or more sample or replacing a number of samples with a greater number of samples which are calculated from the replaced samples, or any other samples in the stream, and represent the information therein.

As stated above, the present invention also provides reliable detection of audio/video synchronization loss.

The ratio between the sampling rate of audio frames by audio encoder 110 and the sampling rate of video frames by video encoder 120 is designated $RATIO_{SAMPLED}$.

If the audio clock 112 and the video clock 122 are locked, the ratio between the rate at which compressed video frames enter buffer 128 ($VIDEO_{IN}$) and the rate at which compressed audio frames enter buffer 118 (AUDIO$_{IN}$) is on average constant (RATIO$_{IN}$). RATIO$_{IN}$ is equal to RATIO$_{SAMPLED}$.

According to the present invention the multiplexor 132 calculates PTS and DTS fields using the method described above for systems in which the audio clock and the video clock are locked. As described above, these are calculated from the nominal frame times and the index of the frame being stamped. The multiplexor 132 removes a video frame from buffer 128 and an audio frame from buffer 118 that have approximately the same decoding time stamp. Therefore the ratio between the rate at which compressed video frames are removed from buffer 128 (VIDEO$_{OUT}$) and the rate at which compressed audio frames are removed from buffer 118 (AUDIO$_{OUT}$) is on average constant (RATIO$_{OUT}$). RATIO$_{OUT}$ is equal to RATIO$_{SAMPLED}$.

The multiplexor 132 then packetizes the frames, embeds PTS and DTS values as needed and inserts the packets into the multiplexed stream.

$$\frac{VIDEO_{IN}}{AUDIO_{IN}} = \frac{VIDEO_{OUT}}{AUDIO_{OUT}} = RATIO_{SAMPLED},$$

therefore $$VIDEO_{IN} = AUDIO_{IN} \cdot RATIO_{SAMPLED},$$

and $$VIDEO_{OUT} = AUDIO_{OUT} \cdot RATIO_{SAMPLED}.$$

Hence $$VIDEO_{OUT} - VIDEO_{IN} = (AUDIO_{OUT} - AUDIO_{IN}) \cdot RATIO_{SAMPLED}$$

From the above we can deduce that when the audio clock 112 and the video clock 122 are locked, the ratio between the number of video frames in buffer 128 and the number of audio frames in buffer 118 is a constant which is equal to RATIO$_{SAMPLED}$.

If, however, one of the encoders (e.g. the video encoder 120) speeds up, then, it will begin to produce more frames. The operation of the multiplexor does not change despite the change in the video clock and therefore the additional video information will accumulate in buffer 128.

The controller 130 periodically calculates the ratio between the amount of video frames accumulated in buffer 128, with the amount of audio frames accumulated in buffer 118 (RATIO$_{OCCUPANCY}$). The controller 130 calculates the difference DIFF$_{OS}$, between RATIO$_{OCCUPANCY}$ and RATIO$_{SAMPLED}$ as follows:

$$DIFF_{OS} = RATIO_{OCCUPANCY} - RATIO_{SAMPLED}.$$

If DIFF$_{OS}$ is positive (as is the case in the example above) the controller deduces that the video clock is effectively running faster than the audio clock. In this case the number of audio samples should be increased to effectively speed up the audio clock.

If DIFF$_{OS}$ is negative the controller deduces that the video clock is effectively running slower than the audio clock. In this case the number of audio samples should be decreased to effectively slow down the audio clock.

In the present example, measurements of DIFF$_{OS}$ are averaged over several seconds in order to filter out the effect of bursty output from the encoders.

Accordingly, when the controller 130 detects such a loss of synchronization, it provides a command to the audio compressor 116 to increase or decrease the number of audio samples by at least one audio sample. These adjustments will have the same effect as if the audio clock would either speed up or slow down to match the change in the video clock.

The present invention provides a method and a system which effectively cancels out gradual drifts between audio and video encoder clocks, and the effects of problematic video sources overcoming the disadvantages of the prior art.

Figure 3:
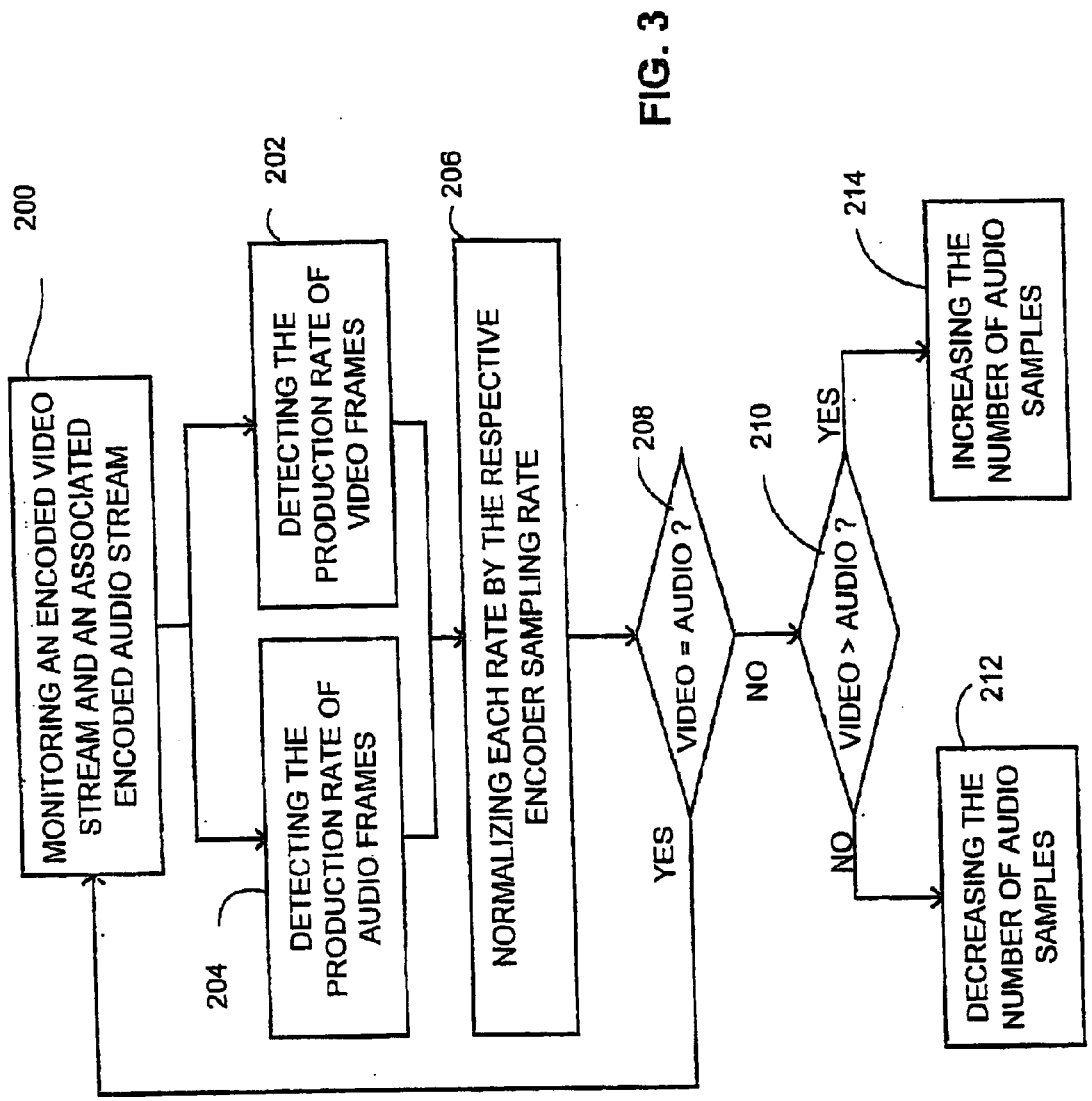
FIG. 3 is an illustration of a method for operating the system of FIG. 2, operative in accordance with another preferred embodiment of the present invention.

Reference is now made to FIG. 3, which is an illustration of a method for operating the system 100 of FIG. 2, operative in accordance with another preferred embodiment of the present invention.

In step 200, the system 100 monitors an encoded video stream and an associated encoded audio stream. It will be noted that more than one audio stream can be associated with the encoded video stream and controller in the same manner. The following explanation is provided for a single audio stream, but can be duplicated for any additional audio stream, associated therewith.

In step 202, the system 100 detects the rate at which encoded video data is produced by the video encoder.

In step 204, the system 100 detects the rate at which encoded audio data is produced by the audio encoder.

In step 206, the system 100 normalizes each rate by the respective encoder sampling rate.

In step 208, the system 100 detects if the normalized rates of encoded video and audio data production, are equal. If so, then the system 100 proceeds back to step 200. Otherwise, the system 100 proceeds to step 210.

In step 210, the system 100 detects which of the normalized rates is greater. If the normalized data production rate of the video encoder is greater than that of the audio encoder, then the system increases the number of audio samples (step 214). Otherwise, the system reduces the number of audio samples (step 212).

It will be noted that after executing either of steps 212 and 214, the system proceeds back to step 200.

Figure 4:
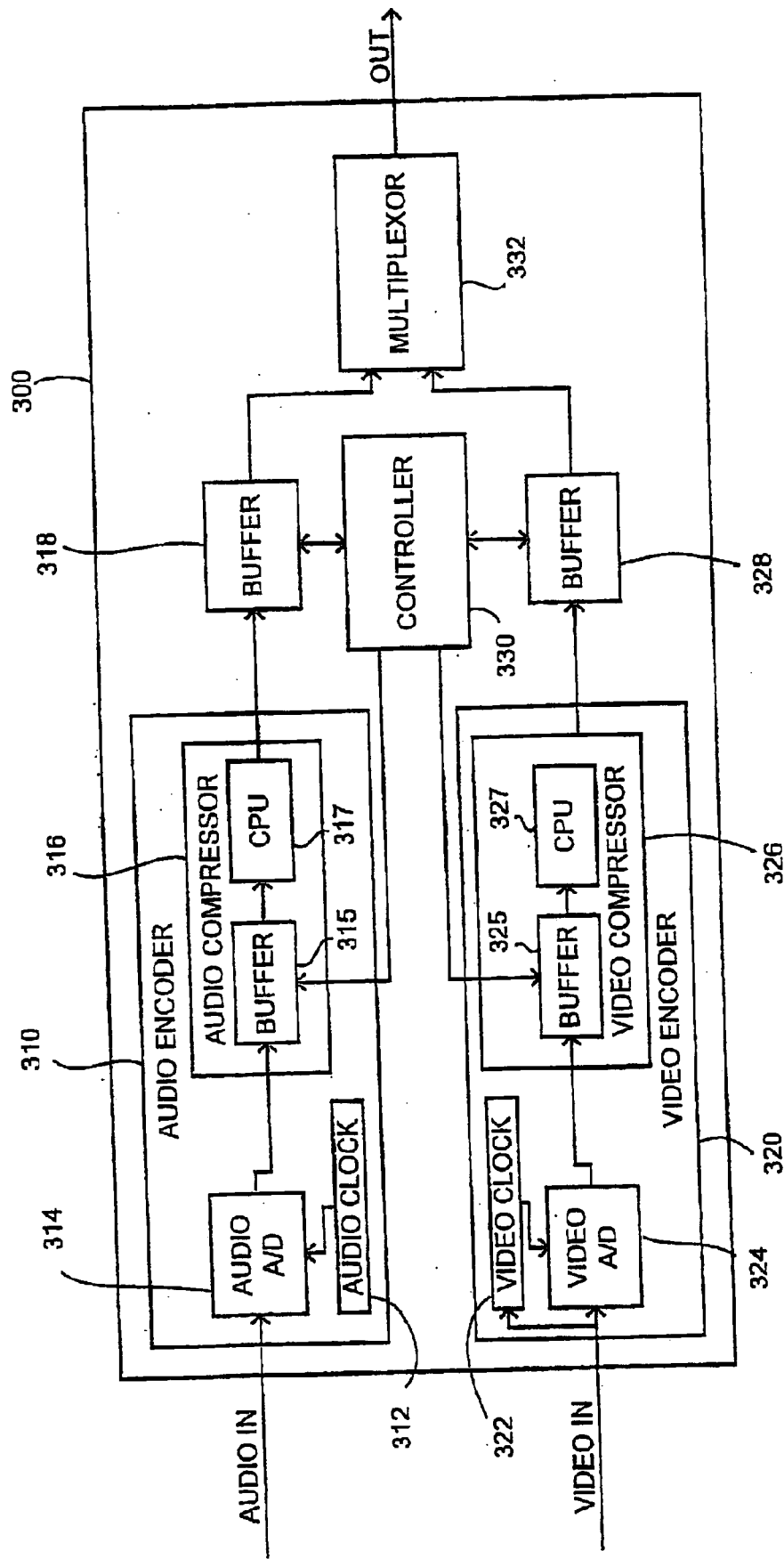
FIG. 4 is a schematic illustration of an encoding system, constructed and operative in accordance with another preferred embodiment of the present invention.

Reference is now made to FIG. 4, which is a schematic illustration of an encoding system, generally referenced 300, constructed and operative in accordance with another preferred embodiment of the present invention. System 300 includes an audio encoder 310, a video encoder 320, two buffers 318 and 328, a controller 330 and a multiplexor 332.

The audio encoder 310 includes an audio A/D converter 314, an audio compressor 316, connected therebetween and an audio clock 312, connected to the A/D converter 314.

The video encoder 320 includes a video A/D converter 324, a video compressor 326, connected therebetween and a clock 322, connected to the A/D converter 324 and to the video source.

The buffer 318 is connected to the audio compressor 316, the controller 330 and the multiplexor 332. The buffer 328 is connected to the video compressor 326, the controller 330 and the multiplexor 332.

The audio compressor 316 includes an input buffer 315, for temporal storage of audio samples and a CPU 317, connected therebetween. The video compressor 326 includes an input buffer 325, for temporal storage of video samples and a CPU 327, connected therebetween. The controller 330 is further connected to buffers 315 and 325.

The digitizer 314 provides audio samples to the compressor 316 at a rate dictated by its sampling clock 312. The compressor 316 has no knowledge of the pass of time except through the samples that arrive at its input.

Similarly, the digitizer 324 provides video samples to the compressor 326 at a rate dictated by its sampling clock 322.

The compressor 326 has no knowledge of the pass of time except through the samples that arrive at its input.

System 300 provides enhanced performance according to the present invention. The system provides several alternative ways in which the number of samples can be increased or decreased in each stream, before or after compression. When the controller 330 detects that the production rate of the encoded audio stream is greater than the production rate of the encoded video stream it can do either of the following:

decrease the number of audio samples in the buffer 315,
  decrease the number of encoded audio samples (audio frames) in the buffer 318,
  increase the number of video samples (e.g. video frames) in the buffer 325, or
  increase the number of encoded video samples (e.g. encoded video frames) in the buffer 328.

Similarly, when the controller 330 detects that the production rate of the encoded video stream is greater than the production rate of the encoded audio stream it can do either of the following:

increase the number of audio samples in the buffer 315,
  increase the number of encoded audio samples (audio frames) in the buffer 318,
  decrease the number of video samples (e.g. video frames) in the buffer 325, or
  decrease the number of encoded video samples (e.g. encoded video frames) in the buffer 328.

It will be noted that decreasing or increasing the number of samples, of any kind, can be performed in many ways, as described above.

Figure 5:
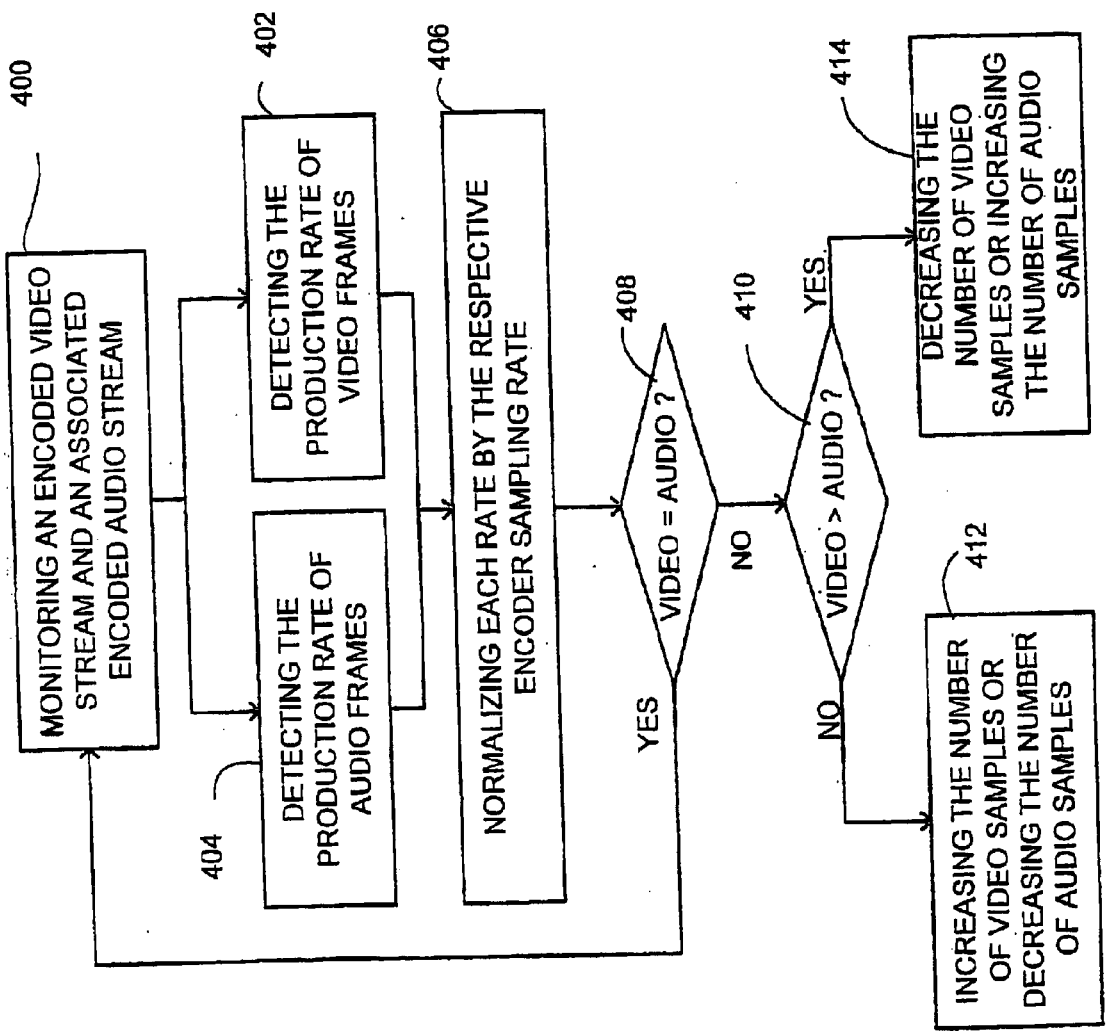
FIG. 5 is an illustration of a method for operating the system of FIG. 4, operative in accordance with a further preferred embodiment of the present invention.

Reference is now made to FIG. 5, which is an illustration of a method for operating the system 300 of FIG. 4, operative in accordance with a further preferred embodiment of the present invention.

In step 400, the system 300 monitors an encoded video stream and an associated encoded audio stream. It will be noted that more than one audio stream can be associated with the encoded video stream and controller in the same manner. The following explanation is provided for a single audio stream, but can be duplicated for any additional audio stream, associated therewith.

In step 402, the system 300 detects the rate at which encoded video data is produced by the video encoder.

In step 404, the system 300 detects the rate at which encoded audio data is produced by the audio encoder.

In step 406, the system 300 normalizes each rate by the respective encoder sampling rate.

In step 408, the system 300 detects if the normalized rates of encoded video and audio data production, are equal. If so, then the system 300 proceeds back to step 400. Otherwise, the system 300 proceeds to step 410.

In step 410, the system 300 detects which of the normalized rates is greater.

If the normalized data production rate of the video encoder is greater than that of the audio encoder, then the system either increases the number of audio samples or decreases the number of video samples (step 414). It will be noted that these samples can be either "raw" non-encoded samples (e.g. at buffers 315 and 325) or encoded samples (e.g. at buffers 318 and 328).

If the normalized data production rate of the audio encoder is greater than that of the video encoder, the system either decreases the number of audio samples or increases the number of video samples (step 412). Again it will be noted that these samples can be either "raw" non-encoded samples (e.g. at buffers 315 and 325) or encoded samples (e.g. at buffers 318 and 328).

After executing either of steps 412 and 414, the system proceeds back to step 400.

It will be noted that the present invention is not limited to MPEG. The present invention is applicable for any encoding method, which combines two elementary streams which are likely to encounter synchronization loss.

Figure 6:
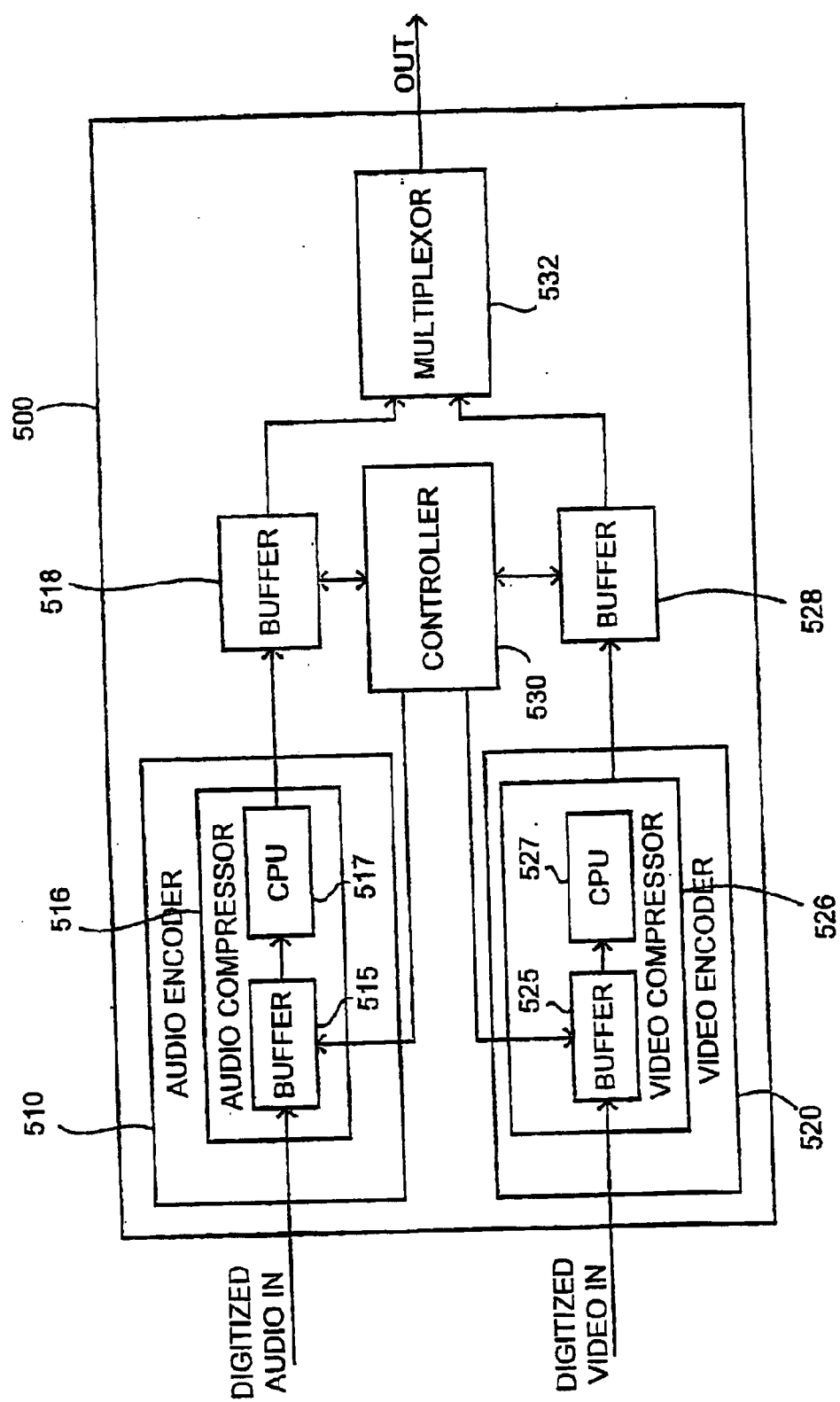
FIG. 6 is a schematic illustration of an encoding system, constructed and operative in accordance with a further preferred embodiment of the present invention.

Reference is now made to FIG. 6, which is a schematic illustration of an encoding system, generally referenced 500, constructed and operative in accordance with yet another preferred embodiment of the present invention. System 500 includes an audio encoder 510, a video encoder 520, two buffers 518 and 528, a controller 530 and a multiplexor 532. System 500 receives digitized elementary streams and therefore, does not include A/D converters and clocks associated therewith.

The encoders 510 and 520 basically include compressors 516 and 526, respectively. However, it will be noted that each of the encoders 510 and 520 can alternatively include any type of encoding device.

The buffer 518 is connected to the audio compressor 516, the controller 530 and the multiplexor 532. The buffer 528 is connected to the video compressor 526, the controller 530 and the multiplexor 532.

The audio compressor 516 includes an input buffer 515, for temporal storage of audio samples and a CPU 517, connected therebetween. The video compressor 526 includes an input buffer 525, for temporal storage of video samples and a CPU 527, connected therebetween. The controller 530 is further connected to buffers 515 and 525.

The compressor 516 receives digitized audio stream from a digitized audio source. The compressor 516 has no knowledge of the pass of time except through the samples that arrive at its input.

Similarly, the compressor 526 receives digitized video stream from a digitized video source. The compressor 526 has no knowledge of the pass of time except through the samples that arrive at its input.

The system 500 provides the same outcome as system 300 (FIG. 4) for digitized elementary sources. Similarly the system 500 provides alternative ways in which the number of samples (digitized or encoded) can be increased or decreased in each stream. When the controller 530 detects that the production rate of the encoded audio stream is greater than the production rate of the encoded video stream it can do either of the following:

decrease the number of audio samples in the buffer 515,
  decrease the number of encoded audio samples (audio frames) in the buffer 518,
  increase the number of video samples (e.g. video frames) in the buffer 525, or
  increase the number of encoded video samples (e.g. encoded video frames) in the buffer 528.

Similarly, when the controller 530 detects that the production rate of the encoded video stream is greater than the production rate of the encoded audio stream it can do either of the following:

increase the number of audio samples in the buffer 515,
  increase the number of encoded audio samples (audio frames) in the buffer 518,
  decrease the number of video samples (e.g. video frames) in the buffer 525, or
  decrease the number of encoded video samples (e.g. encoded video frames) in the buffer 528.

It will be noted that decreasing or increasing the number of samples, of any kind, can be performed in many ways, as described above.

It will be appreciated by persons skilled in the art that the present invention is not limited to what has been particularly shown and described hereinabove. Rather the scope of the present invention is defined only by the claims which follow.

What is claimed is:

1. A method of synchronizing at least two data streams comprising:
   receiving a first encoder output stream comprising a plurality of encoded samples and derived from a first non-encoded input stream by sampling at a first specified sampling rate;
   receiving a second encoder output stream comprising a plurality of encoded samples and derived from a second non-encoded input stream by sampling at a second specified sampling rate;
   measuring independently of said first non-encoded input stream a property of the first encoder output stream;
   measuring independently of said second non-encoded input stream a property of the second encoder output stream;
   determining a loss of synchronism between said first encoder output stream and said second encoder output stream based on said measured properties of the first encoder output stream and the second encoder output stream; and
   compensating for said loss of synchronism.

2. The method as in claim 1, wherein measuring a property of the first encoder output stream comprises receiving a signal responsive to the number of encoded samples in the first encoder output stream, and wherein measuring a property of the second encoder output stream comprises receiving a signal responsive to the number of encoded samples in the second encoder output stream.

3. The method as in claim 1, wherein measuring a property of the first encoder output stream comprises measuring a property responsive to the number of encoded samples in the first encoder output stream, and wherein measuring a property of the second encoder output stream comprises measuring a property responsive to the number of encoded samples in the second encoder output stream.

4. The method as in claim 3, wherein determining a loss of synchronism comprises:
   dividing the number of encoded samples by the sampling rate specified for each encoded stream respectively, to compute an encoded time value for each encoder output stream; and
   comparing the encoded time value for the first encoder output stream to the encoded time value for the second encoder output stream.

5. The method as in claim 4, wherein compensating for loss of synchronism comprises increasing the rate of production of one of said first and second encoder output streams if the encoded time value for the one stream is less than the encoded time value for the other encoder output stream.

6. The method as in claim 5, wherein increasing the rate of production of the one encoder output stream comprises increasing the number of non-encoded samples in the non-encoded input stream associated with the one encoder output stream.

7. The method as in claim 5, wherein increasing the rate of production of the one encoder output stream comprises increasing the number of encoded samples in the one encoder output stream.

8. The method as in claim 4, wherein compensating for loss of synchronism comprises reducing the rate of production of one of said first and second encoder output streams if the encoded time value for the one stream is greater than the encoded time value for the other encoder output stream.

9. The method as in claim 8, wherein reducing the rate of production of the one encoder output stream comprises reducing the number of non-encoded samples in the non-encoded input stream associated with the one encoder output stream.

10. The method as in claim 8, wherein reducing the rate of production of the one encoder output stream comprises reducing the number of encoded samples in the one encoder output stream.

11. The method as in claim 1 further comprising:
    placing encoded samples of the first and second streams into a first buffer and a second buffer respectively, wherein measuring a property of the first encoder output stream comprises measuring the number of encoded samples in the first buffer, and wherein measuring a property of the second encoder output stream comprises measuring the number of encoded samples in the second buffer; and
    computing an actual encoder production ratio based on dividing the number of encoded samples in the first buffer divided by the number of encoded samples in the second buffer,
    wherein determining a loss of synchronism between said first encoder output stream and second encoder output stream comprises computing a difference between the actual encoder production ratio and the ratio of the first sampling rate to the second sampling rate.

12. The method of claim 11, wherein receiving first and second encoded data streams comprises associating a timestamp with an encoded sample, wherein the difference between the timestamps of two consecutive encoded samples is related to one divided by the sampling rate for the stream containing said encoded sample.

13. The method of claim 12, further comprising selecting first or second buffer in an order for removal of encoded samples from said selected buffer, wherein the order of the selection of said buffers permits buffers in a decoder adapted to receive said removed encoded samples in said order and to decode said samples according to said timestamps not to overflow or underflow.

14. The method of claim 12, further comprising selecting first or second buffer in an order for removal of encoded samples from said selected buffer, wherein the difference between the timestamps of encoded samples from consecutive selections in said order does not exceed a specified value.

15. The method of claim 11, further comprising multiplexing the encoded samples of the first and second encoded data streams removed from the first and second buffers respectively into an output data stream.

16. A device for synchronizing at least two data streams comprising:
    a measuring means for measuring a property of a first encoded output stream derived from a first non-encoded input stream and a second encoded output stream derived from a second non-encoded input stream respectively,
    a determining means for determining a loss of synchronism between said first output stream and second output stream based on said property independently of said first and second non-encoded input streams, and
    a compensating means for compensating for said loss of synchronism.

17. A device for synchronizing at least two data streams comprising a controller to receive a first encoded output stream derived from a first non-encoded input stream and a second encoded output stream derived from a second non-encoded input stream, to measure a property of said first encoded output stream and a property of said second encoded output stream, to determine a loss of synchronism between said first output stream and second output stream based on said property of the first and said second encoder output streams independently of said first and second non-encoded input streams, and to compensate for said loss of synchronism.

18. The device as in claim 17 further comprising:
a first encoder to receive said first non-encoded input stream and provide said first encoded output stream; and
a second encoder to receive said second non-encoded input stream and provide said second encoded output stream.

19. The device of claim 18, further comprising:
a first buffer to receive at least part of said first encoded output stream from said first encoder; and
a second buffer to receive at least part of said second encoded output stream from said second encoder.

20. The device of claim 19, further comprising a multiplexer connected to receive encoded samples from said first and second buffers.

21. The device of claim 20, wherein said controller is adapted to measure the number of encoded samples of the first stream in the first buffer and the number of encoded samples of the second stream in the second buffer.

* * * * *